(12) United States Patent
Shimizu et al.

(10) Patent No.: US 8,298,726 B2
(45) Date of Patent: Oct. 30, 2012

(54) VOLUME PHASE HOLOGRAM RECORDING MATERIAL AND OPTICAL INFORMATION RECORDING MEDIUM

(75) Inventors: Takehiro Shimizu, Kitakyushu (JP); Kazuyoshi Masaki, Kitakyushu (JP); Hidetaka Fujimatsu, Kitakyushu (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 346 days.

(21) Appl. No.: 12/525,806

(22) PCT Filed: Feb. 4, 2008

(86) PCT No.: PCT/JP2008/051776
§ 371 (c)(1),
(2), (4) Date: Aug. 21, 2009

(87) PCT Pub. No.: WO2008/096712
PCT Pub. Date: Aug. 14, 2008

(65) Prior Publication Data
US 2009/0310196 A1    Dec. 17, 2009

(30) Foreign Application Priority Data

Feb. 5, 2007  (JP) ................................ 2007-025448
Nov. 21, 2007  (JP) ................................ 2007-301831

(51) Int. Cl.
*G03H 1/02*    (2006.01)
(52) U.S. Cl. .......... 430/1; 430/2; 430/281.1; 430/286.1; 430/290; 359/3
(58) Field of Classification Search ........................ None
See application file for complete search history.

(56) References Cited

U.S. PATENT DOCUMENTS

| | | | |
|---|---|---|---|
| 6,482,551 B1 * | 11/2002 | Dhar et al. ................. | 430/1 |
| 2003/0096172 A1 * | 5/2003 | Ichihashi et al. ............. | 430/1 |
| 2005/0058911 A1 * | 3/2005 | Takeyama .................. | 430/1 |
| 2005/0185232 A1 | 8/2005 | Teranishi et al. | |
| 2006/0194122 A1 * | 8/2006 | Takizawa .................. | 430/1 |
| 2011/0134741 A1 * | 6/2011 | Ando et al. ................. | 369/103 |

FOREIGN PATENT DOCUMENTS

| | | |
|---|---|---|
| EP | 1 731 975 A1 | 12/2006 |
| EP | 1729184  * | 12/2006 |
| JP | 2-3081 A | 1/1990 |
| JP | 7-199777 A | 8/1995 |
| JP | 11-352303 A | 12/1999 |
| JP | 2001-109360 A | 4/2001 |
| JP | 2001-282082 A | 10/2001 |
| JP | 2004-29042 A | 1/2004 |
| JP | 2004-138686 A | 5/2004 |
| JP | 2005-283905  * | 10/2005 |
| JP | 2006-3387 A | 1/2006 |
| JP | 2006-3388 A | 1/2006 |
| JP | 2006-208772 A | 8/2006 |
| WO | WO-03/081344 A1 | 10/2003 |
| WO | WO-2005/078532 A1 | 8/2005 |

OTHER PUBLICATIONS

Machine translation of 2005-283905 (Oct. 2005).*
International Search Report for the Application No. PCT/JP2008/051776 mailed May 20, 2008.
International Preliminary Report on Patentability for Application No. PCT/JP2008/051776 mailed Aug. 20, 2009.
Trentler, Timothy J. et al., "Epoxy Resin-Photopolymer Composites for Volume Holography", Chemistry of Materials, 2000, vol. 12, pp. 1431-1438.
Supplementary European Search Report for the Application No. EP 08 71 0755 dated May 26, 2011.

* cited by examiner

*Primary Examiner* — Martin Angebranndt
(74) *Attorney, Agent, or Firm* — Cheng Law Group, PLLC

(57) ABSTRACT

Disclosed is a volume phase hologram recording material of high sensitivity, high contrast, and excellent record retention properties and also disclosed is a volume phase hologram recording medium using the said material. The volume phase hologram recording material mainly contains a three-dimensional crosslinked polymer matrix, a radically polymerizable monomer, and a photoradical polymerization initiator. The three-dimensional crosslinked polymer matrix is formed from a matrix-forming compound having two photoradically polymerizable unsaturated groups and two non-photoradically polymerizable hydroxyl groups represented by the following general formula (1) and another matrix-forming compound having no photoradically polymerizable group.

25 Claims, No Drawings

VOLUME PHASE HOLOGRAM RECORDING MATERIAL AND OPTICAL INFORMATION RECORDING MEDIUM

TECHNICAL FIELD

This invention relates to a material suitable for volume phase hologram recording which performs recording/reproduction of information using a coherent active energy ray and to an optical information recording medium using the said material

BACKGROUND TECHNOLOGY

Hologram information recording is a system for recording/reproduction of information as two-dimensional page data and it can increase the recording density and transmission speed sharply compared with a bit data system such as DVD. For this reason, constant efforts are being made on research and development of hologram information recording as one of the promising next-generation information recording systems.

In particular, an optical information recording medium (hereinafter also referred to as hologram recording medium) using a volume phase hologram recording material (hereinafter also referred to as hologram recording material) shows a diffraction efficiency of 1, the theoretical maximum, and allows overwriting (multiple recording) of information. Hence, there are great expectations for arrival of the time when this medium is put into practical use for high-density recording. Photopolymers are frequently used as hologram recording materials in consideration of simplicity of manufacture and diversity in selection of raw materials When the recording layer of a hologram recording medium containing radically photopolymerizable components and a radical photoinitiator (the recording layer of this kind may hereinafter also be referred to as hologram recording layer) is irradiated simultaneously with a reference beam and an information beam, both composed of a coherent active energy ray, a light-and-dark interference pattern is created and this induces polymerization reaction to occur in the light area and causes the polymerizable components to diffuse in the direction to diminish and eliminate the concentration gradient generated by the polymerization reaction, that is, the polymerizable components diffuse from the dark area to the light area of the interference pattern. On the other hand, the non-polymerizable components diffuse in the direction to compensate for the diffused polymerizable components, that is, in the reverse direction from the light area to the dark area of the interference pattern. Thus, the components are distributed by concentration in the hologram recording layer corresponding to the light intensity of the interference pattern and this is recorded as a modulation structure of the refractive index.

The recording capacity of a hologram recording medium is proportional to the thickness of a hologram recording layer in principle. Therefore, it is advantageous to make a hologram recording layer as thick as possible within the allowable range, that is, to the extent that the influence of such factors as light absorption by the materials and volume shrinkage accompanying the polymerization reaction on the recording performance is substantially tolerated. The thickness of a hologram recording layer demanded in reality ranges from approximately 200 μm to 2 mm and this is extremely thick in comparison with that of the conventional light information recording media.

The patent document 1 discloses a substantially solid photopolymerizable composition that forms an image of refractive index by exposure to a chemically active radiation as the only treating step and essentially comprises 25-75% of (a) a solvent-soluble, thermoplastic polymer binder, 5-60% of (b) a liquid ethylenic monomer, and 0.1-10% of (c) a photopolymerization initiator that activates the polymerization of the said ethylenic monomer upon exposure to a chemically active radiation. A solvent is used here to dissolve the components uniformly and to lower the viscosity of the composition to such a degree as to allow easy application to a substrate. The composition is applied to a substrate and the solvent is then removed by evaporation in a drying step to form a hologram recording layer and the necessity of providing a drying step for evaporation and removal of the solvent has substantially limited the thickness of the recording layer to 100 μm or less.

Several disclosures have been made on hologram recording materials that can form a relatively thick hologram recording layer of approximately 200 μm or more without need of solvents, hologram recording media using the said materials, and the methods of manufacture. For example, some of them disclose a three-dimensional crosslinked polymer matrix formed in-situ during the formation of a hologram recording layer (the patent documents 2-7, the non-patent document 1, and elsewhere).

The aforementioned three-dimensional crosslinked polymer matrix is considered to play multiple roles of providing a hologram recording material with enough strength to maintain the proper shape as a hologram recording layer, suppressing excessive migration of polymerizable compounds, and reducing the volume shrinkage accompanying the polymerization in the course of hologram recording (the non-patent document 1).

The patent document 2 discloses an optical article wherein the product consists of a three-dimensional crosslinked polymer matrix and one kind or more of photoreactive monomers, at least one kind of photoreactive monomer contains a monomeric functional group and additionally a portion which is substantially non-existent in the polymer matrix, and the matrix polymer is compatible with a polymer formed by the polymerization of one kind or more of photoreactive monomers. The patent document 2 further discloses an optical product wherein a three-dimensional crosslinked polymer matrix is formed in the presence of the aforementioned one kind or more of photoreactive monomers by a polymerization reaction that is independent of the polymerization of the said one kind or more of photoreactive monomers.

The hologram recording medium of the aforementioned composition requires no solvent in the formation of a hologram recording layer and it has an advantageous ability to form a layer with a thickness in the range of several hundreds of micrometers to several millimeters relatively easily.

High transparency is required for a hologram recording medium. Therefore, the three-dimensional crosslinked polymer matrix is required to be compatible with a polymerizable monomer and with a polymer formed therefrom.

However, only a limited number of matrix polymer-monomer combinations satisfy this requirement of compatibility as far as the optical products disclosed in the patent document 2 are concerned. Moreover, even a combination showing satisfactory compatibility may have a problem in that the difference in refractive index between the matrix polymer and the monomer or between the matrix polymer and the polymer formed from the monomer cannot be made sufficiently large.

The data recorded as an interference pattern in hologram information recording are fixed completely by a treatment such as post-exposure. In continuous recording of a large volume of data, a long time is required from the beginning of recording of data to the completion of fixing of the recorded data and the data once recorded may deteriorate in the meantime. Therefore, a hologram recording medium is required to retain the data recorded in whatever time required from the continuous recording to the fixing treatment intact (this property is hereinafter referred to as record retention property).

However, the problem with the optical products disclosed in the patent document 2 is their insufficient record retention properties.

The patent document 3 discloses a volume phase hologram recording material that comprises a three-dimensional crosslinked polymer matrix having a plurality of reactive groups and an ability to record interference fringes created by the interference of a coherent light utilizing the difference in refractive index and has no polymerizable monomer as a constituent to record a hologram.

The patent document 4 discloses a photosensitive composition for volume phase hologram recording which comprises (a) a compound having one or more active methylene groups in the molecule or a compound having two or more active methylene groups in the molecule, (b) a compound having two or more groups in the molecule to which an active methylene group or a carbanion formed therefrom adds nucleophilically, (c) a catalyst for the Michael reaction, (d) a photopolymerizable compound, and (e) a photopolymerization initiator.

The hologram recording materials disclosed in the patent documents 3 and 4 show improved record retention properties, but they are still insufficient in sensitivity.

As described above, a number of materials containing a three-dimensional crosslinked polymer matrix to be produced in the step for forming a hologram recording layer are disclosed as hologram recording materials, but no material of high sensitivity, high contrast, and good record retention properties has been offered yet.

Patent document 1: JPH2-3081 A
Patent document 2: JPH11-352303 A
Patent document 3: WO2005/078531
Patent document 4: JP2005-275389 A
Patent document 5: JP2004-287138 A
Patent document 6: JP2005-250060 A
Patent document 7: WO2005/78532

Non-patent document 1: T. J. Trentler, J. B. Boyd, and V. L. Colvin, Epoxy Resin-Photopolymer Composites for Volume Holography, Chemistry of Materials, Vol. 12, pp. 1431-1438 (2000)

DISCLOSURE OF THE INVENTION

Problems to be Solved by the Invention

An object of this invention is to provide a volume phase hologram recording material of high sensitivity, high contrast, and excellent record retention properties and a volume phase hologram recording medium using the said material.

This invention relates to a volume phase hologram recording material mainly containing (a) a three-dimensional crosslinked polymer matrix, (b) a photoradically polymerizable monomer, and (c) a photoradical polymerization initiator wherein the three-dimensional crosslinked polymer matrix (a) has photoradically polymerizable groups and is formed from a polymer matrix-forming material (A) containing 0.5-40 wt % of a matrix-forming compound having photoradically polymerizable groups (a1) and a matrix-forming compound having no radically polymerizable group (a2) and the aforementioned matrix-forming compound having photoradically polymerizable groups (a1) is represented by the following formula (1):

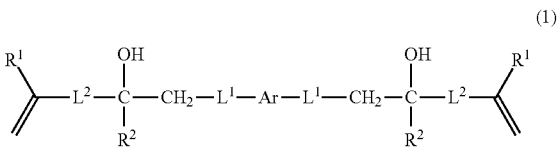

in the formula, Ar is a divalent group having one or more aromatic rings, $R^1$ and $R^2$ each is independently a hydrogen atom or a methyl group, $L^1$ is an oxygen atom, a sulfur atom, or $—(OR^3)_nO—$, $R^3$ is an alkylene group, n is an integer of 1-4, and $L^2$ is a divalent group optionally having aromatic rings.

Preferable examples of the matrix-forming compound having photoradically polymerizable groups (a1) are the compounds represented by the following formulas (2)-(5).

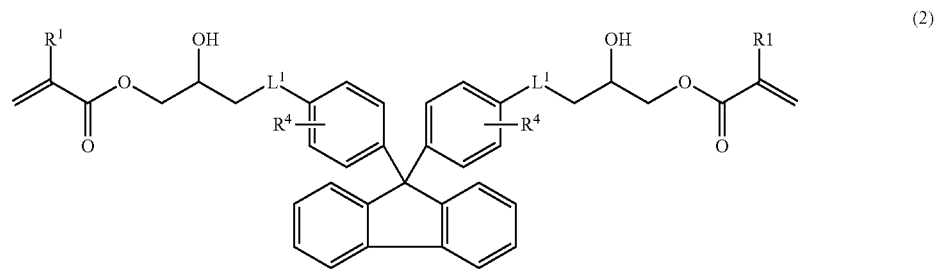

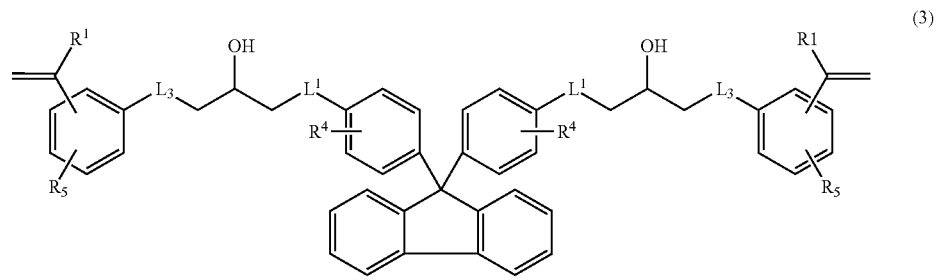

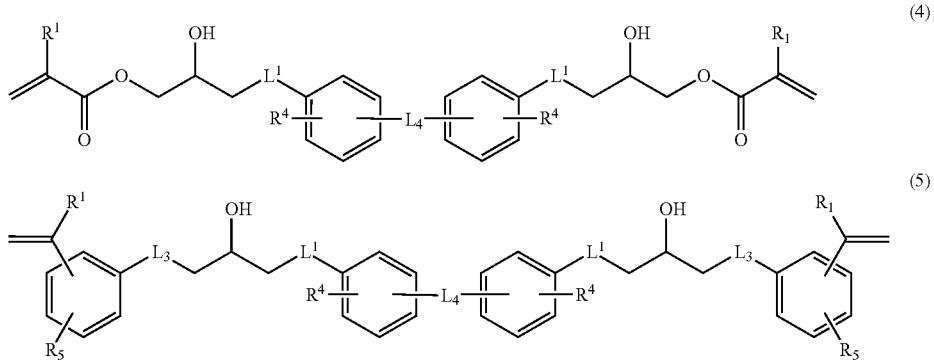

In these formulas, $R^1$ is independently a hydrogen atom or a methyl group, $R^4$ is independently a hydrogen atom or an alkyl group of 1-4 carbon atoms, $R^5$ is a hydrogen atom, a halogen atom, an alkyl group of 1-4 carbon atoms, or an alkoxyl group of 1-4 carbon atom; $L^1$ is an oxygen atom, a sulfur atom, or —$(OR^3)_nO$—, $L^3$ is an oxygen atom, a sulfur atom, —C(O)O—, or —$N(R^6)$—, $L^4$ is a single bond, an oxygen atom, a sulfur atom, a sulfonyl group, or an alkylene group; n is an integer of 1-4, $R^3$ is an alkylene group, and $R^6$ is a hydrogen atom or an alkyl group of 1-4 carbon atoms.

The photoradically polymerizable monomer or the component (b) preferably contains 50 wt % or more of a monofunctional monomer (b1) containing one ethylenic double bond and a plurality of aromatic rings in the molecule and the refractive index $n_D$ of the monofunctional monomer (b1) is preferably 1.60 or more. Preferable examples include one kind or more of compounds selected from the group of vinylnaphthalene, vinylbiphenyl, vinylterphenyl, N-vinylcarbazole, vinylpyrene, dibenzofulvene, benzyl vinylbenzyl sulfide, and phenyl vinylphenyl sulfide and derivatives of the foregoing compounds.

The aforementioned volume phase hologram recording material of excellent properties can be obtained under the following conditions: (1) the polymer matrix-forming material (A) is a mixture of two kinds or more or three kinds or more of compounds and the mixture contains a combination wherein the difference in refractive index is 0.05 or more in absolute value, (2) the polymer matrix-forming material (A) further contains one kind or more of non-reactive compounds (d) which are compatible with the three-dimensional crosslinked polymer matrix or the component (a), or (3) the polymer matrix-forming material (A) contains at least one kind of chain transfer agent which is compatible with the three-dimensional crosslinked polymer matrix (a) in an amount of 0.1-20 wt % of the total hologram recording material.

Further, this invention relates to an optical information recording material for volume phase hologram recording wherein the aforementioned volume phase hologram recording material is formed on a support or between two supports.

Further, this invention relates to a volume phase hologram recording material precursor mainly containing the polymer matrix-forming material (A), the photoradically polymerizable monomer (b), and the photoradical polymerization initiator (c) wherein the polymer matrix-forming material (A) contains 0.5-40 wt % of the matrix-forming compound having photoradically polymerizable groups (a1) and the matrix-forming compound having no photoradically polymerizable group (a2) and forms a three-dimensional crosslinked polymer matrix by a polymerization reaction other than a photoradical polymerization reaction and the aforementioned matrix-forming compound having photoradically polymerizable groups (a1) is an unsaturated compound represented by the aforementioned formula (1).

Further, the photoradically polymerizable monomer (b) contained in the volume phase hologram recording material precursor may be a monomer which, like the photoradically polymerizable monomer (b) contained in the volume phase hologram recording material, may be a monomer containing 50 wt % or more of a monofunctional monomer (b1) having a plurality of aromatic rings and one ethylenic double bond in the molecule.

Still further, this invention relates to a method for forming the aforementioned volume phase hologram recording material which comprises converting the aforementioned volume phase hologram recording material precursor to a three-dimensional crosslinked polymer matrix having photoradically polymerizable groups by a polymerization reaction other than a photoradical polymerization reaction.

PREFERRED EMBODIMENTS OF THE INVENTION

According to this invention, a volume phase hologram recording material or a precursor thereof mainly contains a three-dimensional crosslinked polymer matrix (a) or polymer matrix-forming material (A), a photoradically polymerizable monomer (b), and a photoradical polymerization initiator (c). In the following description, the three-dimensional crosslinked polymer matrix will also be referred to as polymer matrix or component (a); likewise, the polymer matrix-forming material (A) as component (A), the photoradically polymerizable monomer (b) as component (b), and the photoradical polymerization initiator (c) as component (c).

The polymer matrix-forming material (A) contains 0.5-40 wt % of a matrix-forming compound having photoradically polymerizable groups (a1) and a matrix-forming compound having no photoradically polymerizable group (a2). In the following description, the matrix-forming compound having photoradically polymerizable groups will also be referred to as photopolymerizable compound or component (a1) and the matrix-forming compound having no photoradically polymerizable group as non-photopolymerizable compound or component (a2).

The volume phase hologram recording material of this invention can be produced advantageously by converting the volume phase hologram recording material precursor of this invention (hereinafter also referred to as hologram recording material precursor) to the aforementioned three-dimensional crosslinked polymer matrix having photoradically polymerizable groups by a polymerization reaction other than a photoradical polymerization reaction. The hologram recording material precursor mainly contains the aforementioned polymer matrix-forming material (A), photoradically polymerizable monomer (b), and photoradical polymerization initiator (c).

The volume phase hologram recording material of this invention mainly contains the aforementioned component (a), component (b), and component (c). The component (a) or the three-dimensional crosslinked polymer matrix is a polymer having photoradically polymerizable groups and these photoradically polymerizable groups are derived from the matrix-forming compound having photoradically polymerizable groups (a1) contained in the component (A). The photoradically polymerizable groups present in the three-dimensional crosslinked polymer matrix may copolymerize with the photoradically polymerizable monomer (b) when the latter undergoes photoradical polymerization.

According to this invention, the three-dimensional crosslinked polymer matrix is preferably formed in-situ during the formation of a hologram recording layer. Advantageously, the three-dimensional crosslinked polymer matrix is formed during the formation of the hologram recording layer from the hologram recording material precursor. In this case, the three-dimensional crosslinked polymer matrix is formed in the copresence of the matrix-forming compound having radically polymerizable groups (a1), the matrix-forming compound having no radically polymerizable group (a2), the radically polymerizable monomer (b), and the photoradical polymerization initiator (c). If the radically polymerizable groups of the component (a1) and those of the component (b) react simultaneously, the performance of the hologram recording material would deteriorate. Therefore, it is preferable to form the polymer matrix without substantially reducing the number of the photoradically polymerizable groups in the components (a1) and (b) even in the copresence of the component (c). Although the component (a1) also contains photoradically polymerizable groups, it is preferable for the component (a1) to participate in the formation of the polymer matrix without substantially reducing the number of the photoradically polymerizable groups. In order to accomplish this end, it is preferable for the component (a1) to have other polymerizable functional groups in addition to the photoradically polymerizable groups. Any polymerizable functional group which does not polymerize photoradically is acceptable as such a polymerizable functional group. Furthermore, two kinds or more of compounds together may play together the role of a polymerizable functional group as in the case where one compound having a hydroxyl group and another compound having a carboxyl group or a derivative thereof undergo polymerization via ester formation. The term polymerization as used in the specification of this invention covers not only a polymerization reaction in which unsaturated groups participate but also polymerization reactions via condensation and polyaddition and the term monomer covers monomeric compounds and polymerizable oligomers. Further, photoradical polymerization includes the case where the polymerization is carried out in the presence of a photopolymerization initiator and the same holds for polymerization involving photoradically polymerizable groups. The functional groups containing olefinic double bonds are suitable as photopolymerizable functional groups. The photoradical polymerization (photoradically polymerizable group) is occasionally abbreviated to radical polymerization (radically polymerizable group).

Examples of the reaction which yields a three-dimensional crosslinked polymer matrix without substantially reducing the number of the photoradically polymerizable groups include the following polymerization reactions that proceed by a mechanism different from that of a photoradical polymerization; a polycondensation reaction, an isocyanate-hydroxyl polyaddition reaction to form polyurethane, an isocyanate-amine polyaddition reaction to form polyurea, an epoxy-amine polyaddition, and an epoxy-hydroxyl polyaddition reaction. The isocyanate-hydroxyl polyaddition reaction can be used advantageously, but a candidate reaction is not limited to it. For the purpose of forming a three-dimensional crosslinked polymer matrix without substantially reducing the number of the photoradically polymerizable groups, it is preferable to cause the polymerization to proceed preferentially by a mechanism different from that of photoradical polymerization by such means as use of a proper catalyst and control of the reaction temperature.

The formation of polyurethane by the isocyanate-hydroxyl polyaddition reaction is given below as an example of the formation of a three-dimensional crosslinked polymer matrix. in this case, the matrix-forming material (A) must contain an isocyanate compound and a hydroxyl compound. Now, as originally defined, the component (A) contains the component (a1) that has photoradially polymerizable groups and the component (a2) that has no photoradically polymerizable group. Therefore, it is preferable here that at least a part of the hydroxyl compound has photoradically polymerizable groups and constitutes the component (a1) while the remaining part of the hydroxyl compound which has no photoradically polymerizable group and the isocyanate compound constitute the component (a2). In order to form a three-dimensional crosslinked polymer matrix, at least one of the isocyanate and hydroxyl compounds must have more than two functional groups on the average.

An isocyanate compound having two or more isocyanate groups in the molecule or a mixture of such isocyanate compounds constitutes the component (a2). Examples include tolylene diisocyanate (TDI), diphenylmethane-4,4'-diisocyanate (MDI), xylylene diisocyanate (XDI), tetramethylxylylene diisocyanate (TMXDI), naphthylene-1,5-diisocyanate (NDI), triphenylmethane-4,4',4"-triisocyanate, dicyclohexylmethane-4,4'-diisocyanate (H12MDI), hydrogenated xylylene diisocyanate (H6XDI), hexamethylene diisocyanate (HDI), trimethylhexamethylene diisocyanate (TMHDI), isophorone diisocyanate (IPDI), norbornane diisocyanate (NBDI), and cyclohexane-1,3,5-triisocyanate and trimers, biurets, adducts, and prepolymers derived from these isocyanate compounds. They can be used singly or as a mixture of two kinds or more.

A hydroxyl compound having two or more hydroxyl groups in the molecule or a mixture of such hydroxyl compounds partly constitutes the component (a2). Examples include polyetherpolyols, polyesterpolyols, and polycarbonatediols. When an isocyanate compound having two isocyanate groups in the molecule (that is, a diisocyanate compound) is selected for use in the isocyanate-hydroxyl polymerization to form a three-dimensional crosslinked polymer matrix, it is preferable to use a hydroxyl compound having three or more hydroxyl groups in the molecule. These hydroxyl compounds may be used singly or as a mixture of two or more.

The component (a1) is a compound represented by the aforementioned general formula (1) and a single compound or a combination of two kinds or more may be used. The component (a1) is a polyhydroxyl compound having two or more hydroxyl groups and photoradically polymerizable groups in the molecule. In general formula (1), Ar is a divalent group having one or more aromatic rings and, specifically, it is a divalent aromatic group of 6-30 carbon atoms optionally containing an oxygen atom or a sulfur atom, $R^1$ and $R^2$ each is independently a hydrogen atom or a methyl group, $L^1$ is an oxygen atom, a sulfur atom, or —$(OR^3)_nO$—, $R^3$ is an alkylene group of preferably 1-4 carbon atoms, n is an integer of 1-4, and $L^2$ is a divalent group optionally having an aromatic ring and, preferably, it is a divalent group of 1-20 carbon atoms optionally containing an oxygen atom or a sulfur atom.

Of the compounds represented by general formula (1), those represented by the aforementioned formulas (2) to (5) are preferred as the component (a1). In these formulas, $R^1$ is independently a hydrogen atom or a methyl group, $R^4$ is independently a hydrogen atom or an alkyl group of 1-4 carbon atoms, $L^1$ is an oxygen atom, a sulfur atom, or —$(OR^3)_nO$—, $L^3$ is an oxygen atom, a sulfur atom, —C(O)O—, or —$N(R^6)$—, $L^4$ is a single bond, an oxygen atom, a sulfur atom, a sulfonyl group, or an alkylene group, n is an integer of 1-4, $R^3$ is an alkylene group, and $R^6$ is a hydrogen atom or an alkyl group of 1-4 carbon atoms. Each symbol has the same meaning throughout formulas (1) to (5) in principle, but it may vary independently in meaning from formula to formula.

Examples of the compounds represented by formula (2) include an adduct of 9,9-bis(4-hydroxyphenyl)fluorene diglycidyl ether with (meth)acrylic acid, an adduct of 9,9-bis(4-hydroxy-3-methylphenyl)fluorene diglycidyl ether with (meth)acrylic acid, and an adduct of 9,9-bis[4-(2-hydroxyethoxy)phenyl]fluorene diglycidyl ether with (meth)acrylic acid.

Examples of the compounds represented by formula (3) include an adduct of 9,9-bis(4-hydroxyphenyl)fluorene diglycidyl ether with vinylbenzoic acid, vinylphenol, vinylthiophenol, or vinylaniline, an adduct of 9,9-bis(4-hydroxy-3-methylphenyl)fluorene diglycidyl ether with vinylbenzoic acid, vinylphenol, vinylthiophenol, or vinylaniline, and an adduct of 9,9-bis[4-(2-hydroxyethoxy)phenyl]fluorene diglycidyl ether with vinylbenzoic acid, vinylphenol, vinylthiophenol, or vinylaniline.

Examples of the compounds represented by formula (4) include adducts of bisphenol A type epoxy resins with (meth)acrylic acid and adducts of bisphenol F type epoxy resins with (meth)acrylic acid.

Examples of the compounds represented by formula (5) include adducts of bisphenol A type epoxy resins with vinylbenzoic acid, vinylphenol, vinylthiophenol, or vinylaniline and adducts of bisphenol F type epoxy resins with vinylbenzoic acid, vinylphenol, vinylthiophenol, or vinylaniline.

The compounds represented by the aforementioned formulas (1)-(5) may be used singly or as a mixture of two or more.

The content of the matrix-forming compound having photoradically polymerizable groups (a1) represented by the aforementioned formula (1) is preferably 0.5-40 wt %, more preferably 1-10 wt %, most preferably 2-6 wt %, of the the polymer matrix-forming material (A) which forms the polymer matrix (a). From another point of view, the concentration of the radically polymerizable groups to be introduced to the three-dimensional crosslinked polymer matrix is preferably 0.01-1.2 mol/kg, more preferably 0.025-0.4 mol/kg, most preferably 0.05-0.2 mol/kg, of the whole polymer matrix-forming material (A). When the radically polymerizable groups are introduced in excess, the hologram recording layer undergoes a large volume change (shrinkage) in excess of the allowable range to deteriorate the recorded data in the course of hologram recording or undergoes excessive curing to harm the sensitivity, particularly, in the course of multiple recording. In the opposite case where introduction of the radically polymerizable groups is too small, a sufficient diffraction efficiency may not be obtained or the record retention properties may deteriorate. Introduction of a structural unit derived from the component (a1) in the aforementioned manner can simultaneously attain a high contrast of the recorded data and good record retention properties, possibly due to the effect of high refractive index and rigidity ascribable to the structure of the component (a1). Further, two or more compounds may constitute the components (a1) and (a2) and, in this case, they are preferably combined in such a manner as to control the difference in refractive index at 0.05 or more.

The volume phase hologram recording material to be provided by this invention aims at recording information by utilizing a contrast of refractive index between the exposed area and the unexposed area. In the volume phase hologram recording medium using this material, at least a part of the contrast of refractive index between the exposed area and the unexposed area is generated by diffusion of a part of the photoradically polymerizable monomer (b) into the exposed area after exposure. A higher contrast of refractive index increases the intensity of signal during readout of holograms. Therefore, it is preferable to make the difference in refractive index between the diffusing photopolymerizable monomer and the three-dimensional crosslinked matrix polymer large in order to obtain a high contrast. However, when this difference becomes too large, scattering occurs excessively at the interface to form turbidity and the recording properties deteriorate. According to this invention, a combination of two kinds or more of compounds that provides a difference in refractive index of 0.05 or more in absolute value is used in the material for forming the three-dimensional crosslinked polymer matrix to control the refractive index. The control of the difference in refractive index between the three-dimensional crosslinked polymer matrix and the photopolymerizable monomer exercised in this way can increase the intensity of signal during readout and maintain a turbidity-free condition.

The reaction for the formation of a three-dimensional crosslinked polymer matrix without substantially reducing the number of the radically polymerizable groups can be accelerated by the use of a proper catalyst. For example, the catalysts useful for the isocyanate-hydroxyl polyaddition reaction include tin compounds such s dimethyltin dilaurate and dibutyltin dilaurate, 1,4-diazabicyclo[2,2,2] octane (DABCO), imidazole derivatives, and tertiary amines such as 2,4,6-tris(dimethylaminomethyl)phenol and N,N-dimethylbenzylamine. These catalysts may be used singly or as a mixture of two or more.

The hologram recording material of this invention is formulated from the aforementioned component (a), the component (b) or the photoradically polymerizable monomer, and the component (c) or the photoradical polymerization initiator. Upon exposure to light, the component (c) generates a radical and initiates the polymerization of the component (b). During this polymerization, at least a part of the component (b) copolymerizes with the photoradically polymerizable functional groups present in the polymer matrix. It is preferable here that the polymer resulting from the component (b) or the component (b) itself is compatible with the polymer matrix to exhibit high transparency. Proper selection of the component (b) contributes to increase the sensitivity of the hologram recording material and the contrast of the recorded data.

Any radically polymerizable monomer which initiates radical polymerization by the action of a coherent active energy ray to be used for hologram recording and is compatible with a three-dimensional crosslinked polymer matrix may be used as the component (b) without restriction and examples include compounds having an acryloyl group, a methacryloyl group, a vinyl group, or an isopropenyl group.

A compound of high refractive index having an aromatic ring or a sulfur atom in the molecule is used preferably as a radically polymerizable monomer (b). Examples of such compounds include styrene, chlorostyrene, bromostyrene, α-methylstyrene, divinylbenzene, diisopropenylbenzene, vinylnaphthalene, divinylnapthalene, vinylbiphenyl, divinylbiphenyl, indene, acenaphthylene, N-vinylcarbazole, N-vinylpyrrolidone, phenyl (meth)acrylate, benzyl (meth)acrylate, phenoxyethyl (meth)acrylate, tribromophenyl (meth)acrylate, tribromophenoxyethyl (meth)acrylate, alkylene oxide-modified bisphenol A di(meth)acrylate, 9,9-bis(4-hydroxyphenyl)fluorene di(meth)acrylate, 9,9-bis(4-hydroxy-3-methylphenyl)fluorene di(meth)acrylate, 9,9-bis[4-(2-hydroxyethoxy)phenyl]fluorene di(meth)acrylate, bis(2-methacryloylthioethyl) sulfide, and bis(4-methacryloylthiophenyl) sulfide. These radically polymerizable monomers may be used singly or as a mixture of two or more.

It is known that there is a suitable range for the modulus of elasticity of a hologram recording material using a photopolymer. The modulus of elasticity of a hologram recording material containing a certain kind of photopolymer stays within this suitable range before recording or in the initial stage of multiple recording (where the multiplicity is low); however, the modulus of elasticity may exceed the upper limit of this suitable range in the later stage of multiple recording (where the multiplicity is high) as more photoradically polymerizable monomers participate in polymerization to form more polymers. Although an increase in modulus of elasticity due to the formation of polymers in the course of recording is inevitable so far as a photopolymer is used in a hologram recording material, it is considered effective to suppress as much as possible an increase in modulus of elasticity upon exposure to a given quantity of light for improvement of the multiple recording properties.

One method for suppressing an increase in modulus of elasticity upon exposure to a given quantity of light utilizes a monofunctional monomer which forms a crosslinked structure with difficulty as a photoradically polymerizable monomer.

Another method utilizes a chain transfer agent or a polymerization inhibitor to control the degree of polymerization of photoradically polymerizable monomers or to control the molecular weight of the product polymers.

When the photoradically polymerizable monomer (b) used for the purpose of suppressing an increase in modulus of elasticity contains a monofunctional monomer (b1) having a plurality of aromatic rings and one ethylenic double bond in the molecule, the monofunctional monomer (b1) is incorporated in an amount of preferably 50 wt % or more, more preferably 70 wt % or more, of the whole photoradically polymerizable monomer (b).

The refractive index $n_D$ of the said monofunctional monomer is preferably 1.60 or more. A single compound or two kinds of more of compounds are preferably selected for use from the group of vinylnaphthalene, vinylbiphenyl, vinylterphenyl, N-vinylcarbazole, vinylpyrene, dibenzofulvene, benzyl vinylbenzyl sulfide, and phenyl vinylphenyl sulfide and derivatives of the foregoing compounds.

The amount of the radically polymerizable monomer (b) to be incorporated is preferably adjusted by the content of the structure derived from the compound having radically polymerizable groups to be introduced to the three-dimensional crosslinked polymer matrix (a). The molar ratio of the radically polymerizable groups in the component (b) to those in the component (a) is preferably 10 or less, more preferably 5 or less, but it is 1.0 or more.

A variety of known photoradical polymerization initiators are available for use as the component (c) and a suitable choice is made from them in correspondence to the wavelength of a coherent active energy ray to be used for hologram recording. Preferable examples include bis($\eta^5$-2,4-cyclopentadien-1-yl)bis(2,6-difluoro-3-(1H-pyrrol-1-yl)phenyl)titanium, bis(2,4,6-trimethylbenzoyl)phenylphosphine oxide, and 2,4,6-trimethylbenzoyldiphenylphosphine oxide.

The amount of the photoradical polymerization initiator varies with the kind of initiator to be used, the concentration of the photoradically polymerizable groups to be introduced to the three-dimensional crosslinked polymer matrix, and the added amount of the radically polymerizable monomer and it cannot be decided routinely. However, it is preferably in the range of 0.05-10 wt %, more preferably in the range of 0.1-5 wt %, of the whole hologram recording material.

In addition to the aforementioned components, it is allowable to incorporate a non-reactive compound that is compatible with the three-dimensional crosslinked polymer matrix and does not react with the said components as component (d) in the hologram recording material or the precursor thereof. This non-reactive compound substantially does not participate in the reaction for the formation of the three-dimensional crosslinked polymer matrix or in the photoradical polymerization reaction in the course of hologram recording and is selected from those compounds that are compatible with the three-dimensional crosslinked polymer matrix. Such non-reactive compounds include plasticizers, viscosity modifiers, and antifoaming agents and plasticizers are preferred. The plasticizers seem to play a role of assisting diffusion of the radically polymerizable components in the hologram recording material and reducing the time required for forming the modulation structure of the refractive index in the course of hologram recording.

The contrast of the recorded data can be improved by selecting a plasticizer of suitable refractive index. For example, when a compound of high refractive index having an aromatic ring or a sulfur atom in the molecule is used as a radically polymerizable monomer, a plasticizer whose refractive index is lower than that of the said radically polymerizable monomer by 0.05 or more is preferably used together.

Furthermore, an additive such as a sensitizer, a stabilizer, a surfactant, and the like may be incorporated.

The hologram recording material of this invention preferably further contains a chain transfer agent in addition to the aforementioned components (a), (b), and (c). The chain transfer agent works particularly effectively in the case where the component (b) contains 50 wt % or more of the component (b1) or the monofunctional monomer. The chain transfer agent is a compound capable of transferring a radical from the growing end in radical polymerization in the course of optical recording and it is preferably capable of exercising an effective control of the degree of polymerization of the polymer being produced. Advantageously, a compound which substantially does not react with the polymer matrix-forming material (A) or with the photoradically polymerizable monomer (b) during the formation of the three-dimensional crosslinked polymer matrix (a) is used as a chain transfer agent. Examples of such compounds include disulfides, dithiocarboxylate esters, and styrene derivatives.

The disulfides include diphenyl disulfide, di-p-tolyl disulfide, dibenzyl disulfide, tetraethylthiuram disulfide, and tetrabutylthiuram disulfide.

The dithiocarboxylate esters include cumyl dithiobenzoate and benzyl dithiobenzoate.

The styrene derivatives include an α-methylstyrene dimer, preferably an α-methylstyrene dimer that contains 2,4-diphenyl-4-methyl-1-pentene as the main component.

The amount of the chain transfer agent to be added varies with the kind of chain transfer agent, the concentration of the radically polymerizable groups in the three-dimensional crosslinked polymer matrix (a), and the amount of the photoradically polymerizable monomer (b) and it cannot be decided routinely. However, it is preferably in the range of 0.1 to 20 wt %, more preferably in the range of 0.2-10 wt %, of the whole hologram recording material. When the chain transfer agent is added in excess, the polymerization reaction in the course of optical recording yields polymers with a low degree of polymerization and the recording sensitivity may be harmed. On the other hand, when the chain transfer agent is added in a too small amount, the degree of polymerization of the product polymer is controlled insufficiently and the multiple recording properties may deteriorate.

When the volume phase hologram recording medium of this invention is prepared, for example, by the isocyanate-hydroxyl polyaddition reaction, the polymer matrix-forming material (A) may be used in the form of a urethane prepolymer prepared in advance. The urethane prepolymer is prepared in the usual manner; that is, an isocyanate compound is mixed with a polyol compound at an NCO/OH ratio of 2.5-4.0 and the mixture is allowed to react at 100-110° C. for 3-5 hours. The polyol compound may have radically polymerizable groups.

The volume phase hologram recording medium of this invention is exposed to light to create a hologram and the hologram is then cured to fix the record. The method for curing is not limited and photocuring or thermal curing may be used.

The volume phase hologram recording medium of this invention is prepared by forming the hologram recording material on the surface of a substrate and used. Concretely, the hologram recording material is formed on a support or between two supports.

A method suitable for preparing the volume phase hologram recording medium comprises applying a liquid composition of the volume phase hologram recording medium precursor to the surface of a substrate such as a glass sheet, a polycarbonate sheet, a polymethyl methacrylate sheet, or a polyester film or injected between two substrates and allowing the precursor to polymerize to yield a three-dimensional crosslinked polymer matrix without substantially reducing the number of the photoradically polymerizable groups. It is allowable to provide a protective layer on the hologram recording layer to shut off oxygen and moisture. Materials like the aforementioned substrates, films of polyolefin, polyvinyl chloride, polyvinylidene chloride, polyvinyl alcohol, or polyethylene terephthalate, or glass may be used for the protective layers.

The volume phase hologram recording medium prepared in the aforementioned manner forms a volume phase hologram by interference exposure performed in the known manner. For example, the said recording medium is submitted to two beam interference exposure in an ordinary holographic exposure apparatus by a laser light or a light of excellent coherence property (a light capable of displaying interference effects; for example, a light with a wavelength of 300-1200 nm) to record interference fringes in the medium. During this stage, a diffractive light is obtained from the recorded diffraction fringes to create a hologram. The light sources suitable for the hologram recording medium of this invention include a He—Ne laser (633 nm), an Ar laser (515, 488 nm), a YAG laser (532 nm), a He—Cd laser (442 nm), and a blue DPSS laser (405 nm). Furthermore, after hologram recording by the aforementioned laser, irradiation of the whole surface by UV rays using a xenon lamp, a mercury lamp, or a metal halide lamp or application of heat of approximately 60° C. to the membrane of a composition for optical recording accelerates the polymerization of a part of the radically polymerizable groups remaining unreacted or the phase separation accompanying the mass transfer to yield a hologram of excellent characteristics.

EXAMPLES

This invention is described concretely below with reference to the accompanying examples, but it is not be limited to the examples.

The abbreviations of the compounds used in the examples are shown below.

HMIC: Hexamethylene diisocyanate (purchased from Tokyo Chemical Industry Co., Ltd.; $n_D$=1.453)

G-400: Polyethertriol (manufactured by ADEKA Corporation; average molecular weight=409; $n_D$=1.469)

ASF-400: Adduct of 9,9-bis(4-hydroxyphenyl)fluorene diglycidyl ether with acrylic acid (manufactured by Nippon Steel Chemical Co., Ltd; $n_D$=1.616)

Irgacure 784: bis($\eta^5$-2,4-cyclopentadien-1-yl)-bis(2,6-difluoro-3-(1H-pyrrol-1-yl)-phenyl)titanium (manufactured by Ciba Specialty Chemicals)

DVB960: Divinylbenzene (manufactured by Nippon Steel Chemical Co., Ltd.; $n_D$=1.579)

BHPDGA: Adduct of 2,2-bis(4-hydroxyphenyl)propane diglycidyl ether with acrylic acid (purchased from Aldrich, $n_D$=1.557)

80MFA: Glycerin diglycidyl ether diacrylate (epoxy ester manufactured by Kyoeisha Chemical Co., Ltd.; $n_D$=1.495)

The term $n_D$ is the refractive index determined at 20° C. or $n_D^{20}$.

Example 1

A recording material precursor was prepared from 30.6 parts by weight of HMIC, 48.0 parts by weight of G-400 as a hydroxyl compound, 4.1 parts by weight of ASF-400 as a matrix-forming compound having radically polymerizable groups, 0.03 part by weight of dibutyltin dilaurate as a catalyst for the isocyanate-hydroxyl polyaddition reaction, 1.2 parts by weight of Irgacure 784 as a photoradical polymerization initiator, 4.1 parts by weight of DVB960 as a radically polymerizable monomer, and 12.0 parts by weight of tributyl O-acetylcitrate ($n_D$=1.443) and introduced into the gap of a device constructed by attaching a glass substrate to another glass substrate, both measuring 30 mm×30 mm and having a thickness of 1.2 mm, with a 0.2 mm-thick silicone film spacer placed between them. The device with its contents was left standing overnight at room temperature and then heated at 50° C. for 3 hours in an atmosphere of nitrogen. An optical information recording medium consisting of a hologram recording medium formed between two glass substrates was obtained.

The optical information recording medium thus obtained was evaluated for recording/reproduction of information using a double beam interference page data tester, SHOT-500GP, manufactured by Pulstec Industrial Co., Ltd. under the following conditions. Readout (reproduction) was performed 60 seconds and 300 seconds after write-in (recording).

The information pattern used was a standard test information pattern (approximately 0.38 kB, data pixel number 6,144).
Conditions for Recording of Data:
  Wavelength of laser for recording/reproduction; 532 nm
  Energy for recording; 0.3 mJ/cm$^2$
  Intensity ratio of information light to reference light; 1.0
Conditions for Reproduction of Data:
  Energy for reproduction; approximately 0.05-0.2 mJ/cm$^2$ (adjusted by the SNR of the reproduced pattern)
Evaluation:
  The SNR of the reproduced pattern was extremely good, 10.4 after 60 seconds and 9.2 after 300 seconds.

Example 2

A recording material precursor was prepared from 29.9 parts by weight of HMIC, 44.7 parts by weight of G-400, 8.2 parts by weight of ASF-400, 0.03 part by weight of dibutyltin dilaurate, 1.2 parts by weight of Irgacure 784, 4.0 parts by weight of DVB960, and 11.9 parts by weight of tributyl O-acetylcitrate and introduced into the gap of a device constructed by attaching a glass substrate to another glass substrate, both measuring 30 mm×30 mm and having a thickness of 1.2 mm, with a 0.2 mm-thick silicone film spacer placed between them. The device with its contents was left standing overnight at room temperature and then heated at 50° C. for 3 hours in an atmosphere of nitrogen. An optical information recording medium consisting of a hologram recording medium formed between two glass substrates was obtained.

The optical information recording medium thus obtained was tested for recording/reproduction of page data as in Example 1.

Evaluation: The SNR of the reproduced pattern was good, 5.6 after 60 seconds and 9.7 after 300 seconds. When the energy for recording was raised from 0.3 mJ/cm$^2$ to 0.6 mJ/m$^2$, the SNR of the reproduced pattern was improved respectively to 10.5 after 60 seconds and to 8.7 after 300 seconds.

Example 3

A recording material precursor was prepared from 25.6 parts by weight of HMIC, 29.3 parts by weight of G-400, 27.5 parts by weight of ASF-400, 0.01 part by weight of dibutyltin dilaurate, 1.2 parts by weight of Irgacure 784, 4.2 parts by weight of DVB960, and 12.1 parts by weight of butyl benzoate ($n_D$=1.498) as a plasticizer and introduced into the gap of a device constructed by attaching a glass substrate to another glass substrate, both measuring 30 mm×30 mm and having a thickness of 1.2 mm, with a 0.2 mm-thick silicone film spacer placed between them. The device with its contents was left standing overnight at room temperature and then heated at 50° C. for 3 hours in an atmosphere of nitrogen. An optical information recording medium consisting of a hologram recording medium formed between two glass substrates was obtained.

The optical information recording medium thus obtained was tested for recording/reproduction of page data as in Example 1.

Evaluation: The SNR of the reproduced pattern was good, 4.2 after 60 seconds and 8.9 after 300 seconds.

Example 4

A recording material precursor was prepared from 27.6 parts by weight of HMIC, 32.3 parts by weight of G-400, 21.9 parts by weight of BHPDGA as a matrix-forming compound having radically polymerizable groups, 0.02 part by weight of dibutyltin dilaurate, 1.2 parts by weight of Irgacure 784, 4.0 parts by weight of DVB960, and 11.8 parts by weight of tributyl O-acetylcitrate and introduced into the gap of a device constructed by attaching a glass substrate to another glass substrate, both measuring 30 mm×30 mm and having a thickness of 1.2 mm, with a 0.2 mm-thick silicone film spacer placed between them. The device with its contents was left standing overnight at room temperature and then heated at 50° C. for 3 hours in an atmosphere of nitrogen. An optical information recording medium consisting of a hologram recording medium formed between two glass substrates was obtained.

The optical information recording medium thus obtained was tested for recording/reproduction of page data as in Example 1.

Evaluation: The SNR of the reproduced pattern was 3.5 after 60 seconds and 6.0 after 300 seconds.

Example 5

A recording material precursor, the same as the one described in Example 1, was prepared and introduced into the gap of a device constructed by attaching a glass substrate to another glass substrate, both measuring 50 mm×50 mm and having a thickness of 0.5 mm and one of them being attached to a vacuum-deposited aluminum layer (reflective layer), with a 0.2 mm-thick silicone film spacer placed between them. The device with its contents was left standing overnight at room temperature and then heated at 50° C. for 3 hours in an atmosphere of nitrogen. An optical information recording medium consisting of a hologram recording medium formed between two glass substrates was obtained.

The optical information recording medium thus obtained was tested for recording/reproduction of information under the following conditions with the aid of a collinear holographic media evaluation system, SHOT-1000, manufactured by Pulstec Industrial Co., Ltd. Readout (reproduction) was performed 30 seconds after write-in (recording). The results are shown in Table 1.

The information pattern used was a standard test information pattern (approximately 1.6 kB, data pixel number 26,112).
Conditions for Recording of Data:
  Wavelength of laser for recording/reproduction; 532 nm
  Intensity of laser for recording; 0.05-1.0 mW (pulse width 10 nsec, pulse interval 50 μsec)
  Intensity ratio of information light to reference light; 0.67
  Number of pulses for recording; 50-1000 pulses
Conditions for Reproduction of Data:
  Intensity of laser for reproduction; 0.1 mW (pulse width 10 nsec, pulse interval 50 μsec)
  Number of pulses for reproduction; 10-30 pulses

TABLE 1

| Intensity of laser for recording (mW) | 0.05 | 0.1 | 1 | 1 | 1 | 1 | 1 | 1 |
|---|---|---|---|---|---|---|---|---|
| Number of pulses for recording | 1000 | 500 | 50 | 100 | 200 | 500 | 1000 | 1000 |

TABLE 1-continued

| Intensity of laser for reproduction (mW) | 0.1 | 0.1 | 0.1 | 0.1 | 0.1 | 0.1 | 0.1 | 0.1 |
|---|---|---|---|---|---|---|---|---|
| Number of pulses for reproduction | 30 | 30 | 30 | 30 | 10 | 10 | 10 | 30 |
| Error rate | <$10^{-4}$ | <$10^{-4}$ | <$10^{-4}$ | <$10^{-4}$ | <$10^{-4}$ | <$10^{-4}$ | <$10^{-4}$ | <$10^{-4}$ |

It is apparent from Table 1 that the medium showed good recording/reproduction characteristics as the error rates (bit error rate) were <$10^{-4}$ under all the test conditions.

Example 6 (Comparative Example)

A recording material precursor was prepared from 32.7 parts by weight of HMIC, 29.4 parts by weight of G-400, 19.6 parts by weight of 80MFA as a matrix-forming compound having radically polymerizable groups, 0.01 part by weight of dibutyltin dilaurate, 2.1 parts by weight of N,N-dimethylbenzylamine, 1.6 parts by weight of Irgacure 784, and 14.7 parts by weight of tributyl O-acetylcitrate and introduced into the gap of a device constructed by attaching a glass substrate to another glass substrate, both measuring 30 mm×30 mm and having a thickness of 1.2 mm, with a 0.2 mm-thick silicone film spacer placed between them. The device with its contents was left standing overnight at room temperature and then heated at 50° C. for 3 hours in an atmosphere of nitrogen. An optical information recording medium consisting of a hologram recording medium formed between two glass substrates was obtained.

The optical information recording medium thus obtained was tested for recording/reproduction of page data as in Example 1.
Evaluation: The SNR of the reproduced pattern was 1.6 after 60 seconds and the recording of data was not confirmed. When the amount of energy for recording was raised from 0.3 mJ/cm² to 1.0 mJ/cm², the SNR of the reproduced pattern still remained low at 2.5 after 60 seconds.

Example 7

A recording material precursor was prepared from 30.8 parts by weight of HMIC, 48.1 parts by weight of G-400, 4.0 parts by weight of ASF-400, 0.03 part by weight of dibutyltin dilaurate, 1.2 parts by weight of Irgacure 784, 4.0 parts by weight of phenyl 4-vinylphenyl sulfide ($n_D$=1.648) as a photoradically polymerizable monomer, and 11.8 parts by weight of tributyl O-acetylcitrate and introduced into the gap of a device constructed by attaching a glass substrate to another glass substrate, both measuring 50 mm×50 mm and having a thickness of 0.5 mm and one of them being attached to a vacuum-deposited aluminum layer (reflective layer), with a 0.2 mm-thick silicone film spacer placed between them. The device with its contents was left standing overnight at room temperature and then heated at 60° C. for 5 hours in an atmosphere of nitrogen. An optical information recording medium consisting of a hologram recording medium formed between two glass substrates was obtained.

The optical information recording medium thus obtained was tested for recording/reproduction of holograms under the following conditions. Reproduction (readout) was performed 30 seconds after recording (write-in). The information pattern used was a standard test information pattern (approximately 1.6 kB, data pixel number 26,112).

Conditions for Recording of Data:
Wavelength of laser for recording/reproduction; 532 nm
Intensity of laser for recording; 1.0 mW (pulse width 10 nsec, pulse interval 50 μsec)
Intensity ratio of information light to reference light; 0.67
Conditions for Reproduction of Data:
Intensity of laser for reproduction; 0.1 mW (pulse width 10 nsec, pulse interval 50 μsec)
Energy for reproduction; approximately 0.13-2.6 mJ/cm² (adjusted by the SNR of the reproduced information)
Evaluation of Recording Sensitivity
The energy of an irradiating laser (mJ/cm²) was changed by changing the number of pulses during recording and the bit error rate (BET) of the reproduced information was measured. The BER usually tends to decrease as the energy for recording increases. In evaluating an optical information recording medium for its recording sensitivity, the minimum amount of energy for recording that yields moderately good reproduced information (BER<$10^{-3}$) was taken as the recording sensitivity.
Evaluation of Multiple Recording Characteristics
The variable pitch spiral (VPS) method that is based on the concept of shifting the recording position spirally from the peripheral area toward the center was used to evaluate the multiple recording characteristics of an optical information recording medium. The number of recorded holograms was 9×9=81 and the shift pitch was 40 μm. in this case, the multiplicity of the last hologram (or the 81st hologram) is 25. When the multiple recording characteristics of an optical information recording medium are insufficient, the SNR of reproduced information decreases as the number of recorded holograms increases. Here, the maximum number of recorded holograms that continuously gives SNR>2.5 was taken as the multiple recording characteristics of an optical information recording medium.
Evaluation of Compatibility of Recording Sensitivity and Multiple Recording Characteristics
The aforementioned recording sensitivity and multiple recording characteristics of an optical information recording medium are normally in a trade-off relationship. Here, the value Y calculated by the following equation was used as an index of compatibility of the recording sensitivity S and the multiple recording characteristics M;

$Y$=(multiple recording characteristics)/(recording sensitivity)$^{1/2}$.

The results are shown in Table 2.

TABLE 2

| | Minimum number of pulses | Recording sensitivity S (mJ/cm²) | Multiple recording characteristics M | Y |
|---|---|---|---|---|
| Ex. 7 | 25 | 3.2 | 40 | 22 |

Example 8

An optical information recording medium was obtained as in Example 7 with the exception of using 10.8 parts by weight of tributyl O-acetylcitrate and newly adding 1.0 part by weight of 2,4-diphenyl-4-methyl-1-pentene ($n_D$=1.569) as a chain transfer agent.

Example 9

An optical information recording medium was obtained as in Example 7 with the exception of using 12.0 parts by weight of phenyl 4-vinylphenyl sulfide and 0.8 part by weight of tributyl O-acetylcitrate and newly adding 3.0 parts by weight of 2,4-diphenyl-4-methyl-1-pentene as a chain transfer agent.

Example 10

An optical information recording medium was obtained as in Example 8 with the exception of using 4.0 parts by weight of 4-vinylbiphenyl ($n_D$=1.659) as a photoradically polymerizable monomer.

Example 11

An optical information recording medium was obtained as in Example 8 with the exception of using 4.0 parts by weight of 2-vinylnaphthalene ($n_D$=1.655) as a photoradically polymerizable monomer.

Example 12

An optical information recording medium was obtained as in Example 8 with the exception of using 2.0 parts by weight of phenyl 4-vinylphenyl sulfide and 20 parts by weight of 3,3'-divinylbiphenyl ($n_D$=1.639) as photoradically polymerizable monomers.

The recording sensitivity S, multiple recording characteristics M, and compatibility index Y evaluated as in Example 1 are shown for Examples 8-12 in Table 3.

TABLE 3

| | Minimum number of pulses | Recording sensitivity S (mJ/cm²) | Multiple recording characteristics M | Y |
|---|---|---|---|---|
| Ex. 8 | 100 | 12.8 | >81 | >23 |
| Ex. 9 | 80 | 10.2 | >81 | >25 |
| Ex. 10 | 100 | 12.8 | >81 | >23 |
| Ex. 11 | 80 | 10.2 | >81 | >25 |
| Ex. 12 | 60 | 7.7 | 70 | 25 |

Example 13 (Comparative Example)

An optical information recording medium was obtained as in Example 7 with the exception of using 4.0 parts by weight of DVB960 as a photoradically polymerizable monomer.

Example 14 (Comparative Example)

An optical information recording medium was obtained as in Example 7 with the exception of using 4.0 parts by weight of 3,3'-divinylbiphenyl as a photoradically polymerizable monomer.

Example 15 (Comparative Example)

An optical information recording medium was obtained as in Example 8 with the exception of using 4.0 parts by weight of 3,3'-divinylbiphenyl as a photoradically polymerizable monomer.

The recording sensitivity S, multiple recording characteristics M, and compatibility index Y were evaluated as in Example 7 and the results are shown in Table 4.

TABLE 4

| | Minimum number of pulses | Recording sensitivity S (mJ/cm²) | Multiple recording characteristics M | Y |
|---|---|---|---|---|
| Ex. 13 | 25 | 3.2 | 15 | 8 |
| Ex. 14 | 20 | 2.6 | 10 | 6 |
| Ex. 15 | 100 | 12.8 | 30 | 8 |

Industrial Applicability

Introduction of a structure containing aromatic rings of relatively high refractive index and having an ability to copolymerize with photoradically copolymerizable monomers into a polymer matrix-forming material can increase the difference in refractive index between the light area and the dark area of an interference pattern during optical recording to be conducted later. Further, the copolymerization with polymers to be formed in the dark area of an interference patter during optical recording improves the compatibility and retains transparency even when the difference in refractive index becomes large. Thus, the polymer matrix-forming material provides a volume phase hologram recording material of high sensitivity, high contrast, and good record retention properties and a volume phase hologram recording medium using the same.

The invention claimed is:

1. A volume phase hologram recording material which comprises mainly containing (a) a three-dimensional crosslinked polymer matrix, (b) a photoradically polymerizable monomer, and (c) a photopolymerization initiator wherein the three-dimensional crosslinked polymer matrix (a) has photoradically polymerizable groups and is formed from a polymer matrix-forming material (A) containing 0.5-40 wt % of a matrix-forming compound having photoradically polymerizable groups (a1) and a matrix-forming compound having no photoradically polymerizable group (a2) and the aforementioned matrix-forming compound having photoradically polymerizable groups (a1) is represented by the following formula (1):

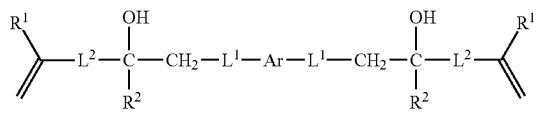

(1)

in formula (1), Ar is a divalent group having one or more aromatic rings, $R^1$ and $R^2$ each is independently a hydrogen atom or a methyl group, $L^1$ is an oxygen atom, a sulfur atom, or —$(OR^3)_nO$—, $R^3$ is an alkylene group, n is an integer of 1-4, and $L^2$ is a divalent group optionally having aromatic rings wherein the photoradically polymerizable groups to be introduced to the three-dimensional crosslinked polymer matrix is in a concentration of 0.01-0.2 mol/kg of the whole polymer matrix-forming material (A).

2. A volume phase hologram recording material as described in claim 1 wherein the photoradically polymerizable monomer (b) contains 50 wt % or more of a monofunctional monomer (b1) having a plurality of aromatic rings and one ethylenic double bond in the molecule.

3. A volume phase hologram recording material as described in claim 2 wherein the monofunctional monomer (b1) has a refractive index ($n_D$) of 1.60 or more.

4. An optical information recording medium for volume phase hologram recording prepared by forming any one of the volume phase hologram recording materials described in claim 3 on a support or between two supports.

5. A volume phase hologram recording material as described in claim 2 wherein the monofunctional monomer (b1) is one kind or more of compounds selected from the group of vinylnaphthalene, vinylbiphenyl, vinylterphenyl, N-vinylcarbazole, vinylpyrene, dibenzofulvene, benzyl vinylbenzyl sulfide, and phenyl vinylphenyl sulfide.

6. An optical information recording medium for volume phase hologram recording prepared by forming any one of the volume phase hologram recording materials described in claim 5 on a support or between two supports.

7. An optical information recording medium for volume phase hologram recording prepared by forming any one of the volume phase hologram recording materials described in claim 2 on a support or between two supports.

8. A volume phase hologram recording material as described in claim 1 wherein the matrix-forming compound having photoradically polymerizable groups (a1) is at least one kind of unsaturated compound represented by any one of the following formulas (2)-(5):

in these formulas, $R^1$ is independently a hydrogen atom or a methyl group, $R^4$ is independently a hydrogen atom or an alkyl group of 1-4 carbon atoms, $R^5$ is a hydrogen atom, a halogen atom, an alkyl group of 1-4 carbon atoms, or an alkoxyl group of 1-4 carbon atoms, $L^1$ is an oxygen atom, a sulfur atom, or —$(OR^3)_nO$—, $L^3$ is an oxygen atom, a sulfur atom, —C(O)O—, or —N($R^6$)—, $L^4$ is a single bond, an oxygen atom, a sulfur atom, a sulfonyl group, or an alkylene group, n is an integer of 1-4. $R^3$ is an alkylene group, and $R^6$ is a hydrogen atom or an alkyl group of 1-4 carbon atoms.

9. An optical information recording medium for volume phase hologram recording prepared by forming any one of the volume phase hologram recording materials described in claim 8 on a support or between two supports.

10. A volume phase hologram recording material as described in claim 1 wherein the polymer matrix-forming material (A) is a mixture of two kinds or more of compounds which are so combined as to control the difference in refractive index at 0.06 or more in absolute value.

11. An optical information recording medium for volume phase hologram recording prepared by forming any one of the volume phase hologram recording materials described in claim 10 on a support or between two supports.

12. A volume phase hologram recording material as described in claim 1 wherein the polymer matrix-forming material (A) further contains at least one kind of non-reactive

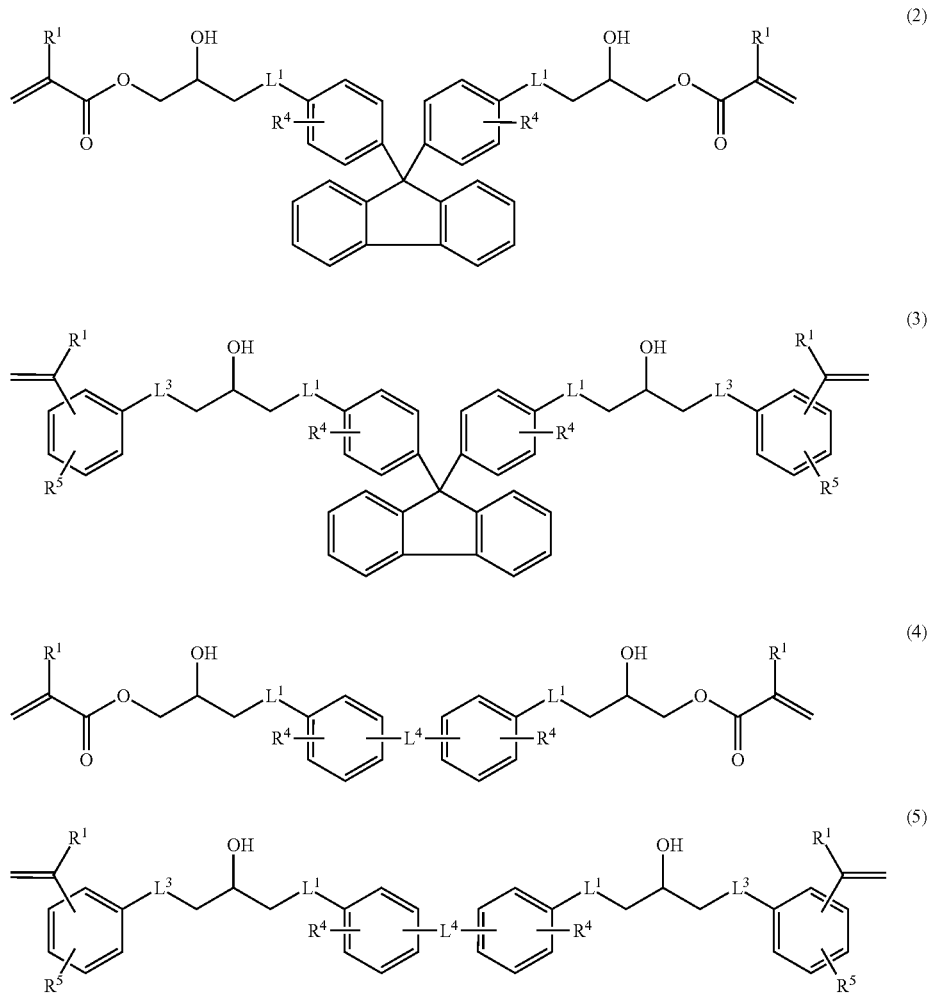

compound (d) which is compatible with the three-dimensional crosslinked polymer matrix (a).

13. An optical information recording medium for volume phase hologram recording prepared by forming any one of the volume phase hologram recording materials described in claim 12 on a support or between two supports.

14. A volume phase hologram recording material as described in claim 1 wherein at least one kind of chain transfer agent which is compatible with the three-dimensional crosslinked polymer matrix (a) is contained in an amount of 0.1-20 wt %.

15. An optical information recording medium for volume phase hologram recording prepared by forming any one of the volume phase hologram recording materials described in claim 14 on a support or between two supports.

16. An optical information recording medium for volume phase hologram recording prepared by forming any one of the volume phase hologram recording materials described in claim 1 on a support or between two supports.

17. A volume phase hologram recording material precursor which comprises mainly containing a polymer matrix-forming material (A), a photoradically polymerizable monomer (b), and a photoradical polymerization initiator (c) wherein the polymer matrix-forming material (A) contains 0.5-40 wt % of a matrix-forming compound having photoradically polymerizable groups (a1) and a matrix-forming compound having no photoradically polymerizable group (a2), a three-dimensional crosslinked polymer matrix is formed by a polymerization reaction other than a photoradical polymerization reaction, and the aforementioned matrix-forming compound having radically polymerizable groups (a1) is an unsaturated compound represented by the following formula (1):

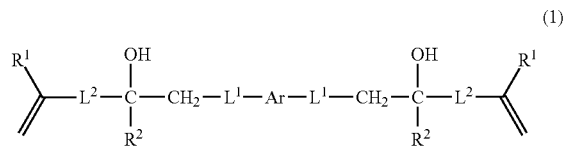

(1)

in formula (1), Ar is a divalent group having one or more aromatic rings, $R^1$ and $R^2$ each is independently a hydrogen atom or a methyl group, $L^1$ is an oxygen atom, a sulfur atom, or $-(OR^3)_n O-$, $R^3$ is an alkylene group, n is an integer of 1-4, and $L^2$ is a divalent group optionally having aromatic rings wherein the photoradically polymerizable groups to be introduced to the three-dimensional crosslinked polymer matrix is in a concentration of 0.01-0.2 mol/kg of the whole polymer matrix-forming material (A).

18. A volume phase hologram recording material precursor as described in claim 17 wherein the photoradically polymerizable monomer (b) contains 50 wt % or more of a monofunctional monomer (b1) having a plurality of aromatic rings and one ethylenic double bond in the molecule.

19. A method for forming a volume phase hologram recording material mainly containing a three-dimensional crosslinked polymer matrix (a), a photoradically polymerizable monomer (b), and a photoradical polymerization initiator (c) which comprises converting the volume phase hologram recording material precursor described in claim 18 by a polymerization reaction other than a photoradical polymerization reaction to a three-dimensional crosslinked polymer matrix having photoradically polymerizable groups.

20. A method for forming a volume phase hologram recording material mainly containing a three-dimensional crosslinked polymer matrix (a), a photoradically polymerizable monomer (b), and a photoradical polymerization initiator (c) which comprises converting the volume phase hologram recording material precursor described in claim 17 by a polymerization reaction other than a photoradical polymerization reaction to a three-dimensional crosslinked polymer matrix having photoradically polymerizable groups.

21. A volume phase hologram recording material which comprises mainly containing (a) a three-dimensional crosslinked polymer matrix, (b) a photoradically polymerizable monomer, and (c) a photopolymerization initiator wherein the three-dimensional crosslinked polymer matrix (a) has photoradically polymerizable groups and is formed from a polymer matrix-forming material (A) containing 0.5-40 wt % of a matrix-forming compound having photoradically polymerizable groups (a1) and a matrix-forming compound having no photoradically polymerizable group (a2) and the aforementioned matrix-forming compound having photoradically polymerizable groups (a1) is represented by the following formula (2) or (3):

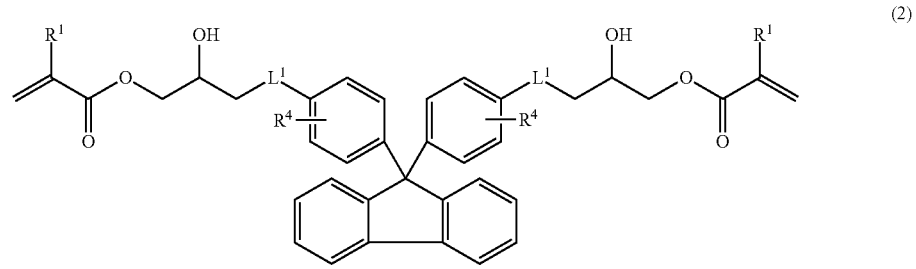

(2)

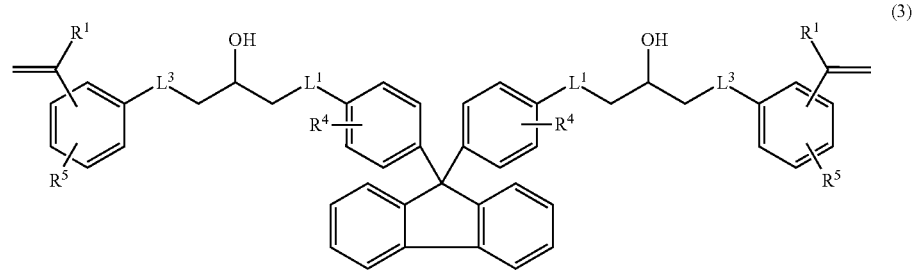

(3)

in these formulas, $R^1$ is independently a hydrogen atom or a methyl group, $R^4$ is independently a hydrogen atom or an alkyl group of 1-4 carbon atoms, $R^5$ is a hydrogen atom, a halogen atom, an alkyl group of 1-4 carbon atoms, or an alkoxyl group of 1-4 carbon atoms, $L^1$ is an oxygen atom, a sulfur atom, or —$(OR^3)_nO$—, $L^3$ is an oxygen atom, a sulfur atom, —C(O)O—, or —N($R^6$)—, n is an integer of 1-4, $R^3$ is an alkylene group, and $R^6$ is a hydrogen atom or an alkyl group of 1-4 carbon atoms wherein the photoradically polymerizable groups to be introduced to the three-dimensional crosslinked polymer matrix is in a concentration of 0.01-0.2 mol/kg of the whole polymer matrix-forming material (A).

22. A volume phase hologram recording material as described in claim 21, wherein the matrix-forming compound having photoradically polymerizable groups (a1) represented by said formula (2) or (3) is in a content of 1-10 wt % of the polymer matrix-forming material (A) which forms the polymer matrix (a).

23. A volume phase hologram recording material as described in claim 21, wherein the photoradically polymerizable groups to be introduced to the three-dimensional crosslinked polymer matrix is in a concentration of 0.025-0.2 mol/kg of the whole polymer matrix-forming material (A).

24. A volume phase hologram recording material as described in claim 21, wherein an isocyanate compound having two or more isocyanate groups in the molecule or a mixture of such isocyanate compounds constitutes the matrix-forming compound having no photoradically polymerizable group (a2).

25. A volume phase hologram recording material precursor which comprises mainly containing a polymer matrix-forming material (A), a photoradically polymerizable monomer (b), and a photoradical polymerization initiator (c) wherein the polymer matrix-forming material (A) contains 0.5-40 wt % of a matrix-forming compound having photoradically polymerizable groups (a I) and a matrix-forming compound having no photoradically polymerizable group (a2), a three-dimensional crosslinked polymer matrix is formed by a polymerization reaction other than a photoradical polymerization reaction, and the aforementioned matrix-forming compound having radically polymerizable groups (a1) is an unsaturated compound represented by the following formula (2) or (3):

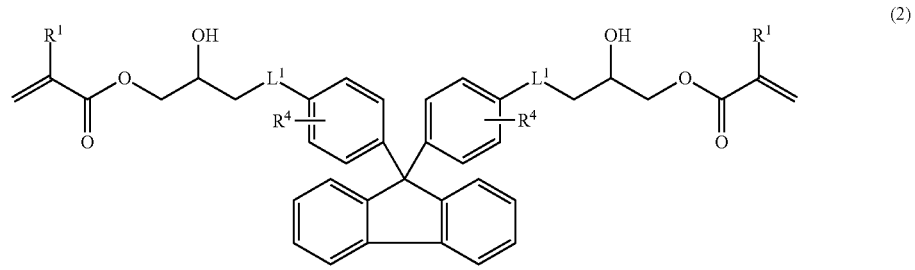

(2)

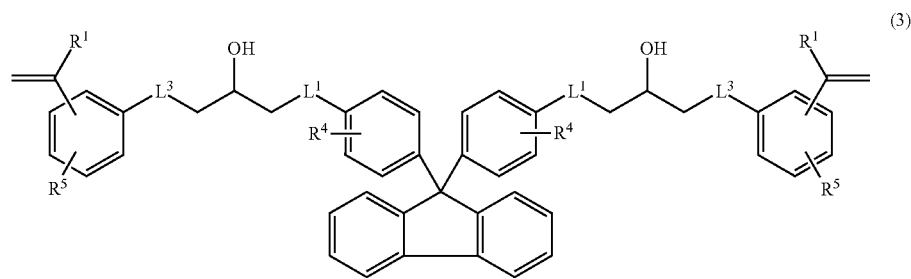

(3)

in these formulas, $R^1$ is independently a hydrogen atom or a methyl group, $R^4$ is independently a hydrogen atom or an alkyl group of 1-4 carbon atoms, $R^5$ is a hydrogen atom, a halogen atom, an alkyl group of 1-4 carbon atoms, or an alkoxyl group of 1-4 carbon atoms, $L^1$ is an oxygen atom, a sulfur atom, or —$(OR^3)_nO$—, $L^3$ is an oxygen atom, a sulfur atom, —C(O)O—, or —N($R^6$)—, n is an integer of 1-4, $R^3$ is an alkylene group, and $R^6$ is a hydrogen atom or an alkyl group of 1-4 carbon atoms wherein the photoradically polymerizable groups to be introduced to the three-dimensional crosslinked polymer matrix is in a concentration of 0.01-0.2 mol/kg of the whole polymer matrix-forming material (A).

* * * * *